(12) United States Patent
Gillin et al.

(10) Patent No.: US 10,857,983 B2
(45) Date of Patent: Dec. 8, 2020

(54) LEVERAGED TRAILER LIFT

(71) Applicant: Kyle R. Gillin, Van, TX (US)

(72) Inventors: Try Gillin, Van, TX (US); Kyle R. Gillin, Van, TX (US)

( * ) Notice: Subject to any disclaimer, the term of this patent is extended or adjusted under 35 U.S.C. 154(b) by 69 days.

(21) Appl. No.: 16/219,792

(22) Filed: Dec. 13, 2018

(65) Prior Publication Data

US 2019/0176780 A1    Jun. 13, 2019

Related U.S. Application Data

(60) Provisional application No. 62/598,174, filed on Dec. 13, 2017.

(51) Int. Cl.
  *B60S 9/02* (2006.01)
  *B60S 9/04* (2006.01)
  *F16H 7/06* (2006.01)

(52) U.S. Cl.
  CPC . *B60S 9/04* (2013.01); *F16H 7/06* (2013.01)

(58) Field of Classification Search
  CPC ...... B60S 9/00; B60S 9/04; B60S 9/18; B60S 11/00; B60S 5/00
  See application file for complete search history.

(56) References Cited

U.S. PATENT DOCUMENTS

| | | | | |
|---|---|---|---|---|
| 4,187,733 A | * | 2/1980 | Walther | B60D 1/66 254/419 |
| 5,871,069 A | * | 2/1999 | Carmitchel | B66F 9/06 187/231 |
| 5,911,437 A | * | 6/1999 | Lawrence | B60S 9/10 254/419 |
| 8,491,009 B2 | * | 7/2013 | Shelton | B60P 3/36 254/418 |
| 8,827,309 B1 | * | 9/2014 | Ouellet | B60S 9/08 254/418 |
| 2008/0116434 A1 | * | 5/2008 | Quarberg | B60S 9/215 254/420 |
| 2019/0176780 A1 | * | 6/2019 | Gillin | B60S 9/04 |

* cited by examiner

*Primary Examiner* — Lee D Wilson
(74) *Attorney, Agent, or Firm* — Foley & Lardner LLP (57) ABSTRACT

This disclosure teaches a device and a system having a gear reduction ratio for use with power tools to mechanically connect to drive shafts of trailer jacks. The device enables the power tools to extend or retract the legs of the trailer jacks in an efficient and easy manner. The device may be installed or retrofitted to existing high capacity trailers or integrated with newly manufactured trailers. In some embodiments, the device has a first interface, a gear train or an equivalent torque magnification mechanism, and a second interface. The first interface enables a power tool or a hand tool to rotationally engage the gear train. The second interface enables the output torque from the gear train to apply to rotate a shaft to raise and/or lower one or more trailer jacks. A power drill can thus couple with the first interface to lift or lower the trailer.

20 Claims, 6 Drawing Sheets

LEVERAGED TRAILER LIFT

CROSS REFERENCE AND PRIORITY CLAIM TO PROVISIONAL APPLICATION

This application claims the benefits and priority of the U.S. Provisional Patent Application No. 62/598,174 filed on Dec. 13, 2017, the entire contents of which are incorporated herein by reference for all purposes.

FIELD

This disclosure relates to a coupling device for trailer jacks.

BACKGROUND

Many trailers are unpowered vehicles towed by a powered vehicle. Trailers are commonly used for the transport of goods and materials. When an unpowered trailer is connected to a powered vehicle, the trailer is lifted so that the trailer's coupler engages the powered vehicles trailer ball or other hitch coupling mechanism. One or more jacks (also known as hitch jacks, tongue jacks, or trailer jacks) installed in the trailer extend vertically against the ground to lift up the coupler.

Often, hitch jacks include a crank that turns internal gears. The rotation of the internal gears can extend a metal leg, such as, for example, by using a worm gear, or a thread mechanism, to convert rotation motion into linear motion. The leg raises, typically at one end, the trailer off the ground so that it can be properly hitched onto the towing vehicle. The exerted lift force is leveraged, usually around the support wheels of the trailer, and known as tongue weight. Manually turning the crank is often tedious and tiring. Such problem is further pronounced when the trailer has a high load capacity and thus a high tongue weight for the jack to overcome. After the coupler is lifted at a higher position than the powered vehicles trailer ball, the jack is retracted by moving the crank in a reverse direction. As such, the coupler is lowered to engage the trailer ball, completing the hitching process.

When the trailer is moved to the destination, a reverse process is needed to unhitch the trailer from the powered vehicle. That is, cranking the jack to lift up the coupler to disengage the trailer ball or hitch coupling mechanism, move away the powered towing vehicle, then lowering the trailer back to a stable, parked position. Thus, both hitching and unhitching steps require a user to crank to extend and retract the legs of the trailer jacks, a very time consuming, tedious, and sometimes dangerous process.

SUMMARY

This disclosure teaches, in one embodiment, a device and a system having a high torque magnification or gear reduction ratio for use with power tools, including even home power tools, to mechanically connect to, or to rotate drive shafts of trailer jacks. The device enables the power tools to extend or retract the legs of the trailer jacks in an efficient, easy, and safe manner. The device may be installed or retrofitted to existing high capacity trailers or integrated with newly manufactured trailers. In some embodiments, the device has a first interface, a gear train or an equivalent torque magnification mechanism, and a second interface. The first interface enables a power tool or a hand tool to rotationally engage the gear train. The second interface enables the output torque from the gear train to apply onto the rotation shaft of the jacks. A common drill can thus couple with the first interface to lift or lower the trailer for efficient and easy operation. More specific aspects of the device and system, in certain implementations, are discussed below.

In a first general aspect, a device includes a first rotatable component rotatably mounted or positioned on or adjacent a first part of a heavy trailer and a second rotatable component rotatably mounted on a second part of the heavy trailer. The first rotatable component is mechanically coupled with the second rotatable component. The rotation of the first rotatable component imparts rotation to the second rotatable component with a torque magnification. The device further includes a first interface rotatably connected to the first rotatable component and a second interface rotatably connected to the second rotatable component. The second interface is mechanically coupled with an input shaft of a trailer jack. A rotation of the second interface drives a rotation of the input shaft of the trailer jack to extend or retract the trailer jack. The first interface is configured to receive an input torque to rotate the first rotatable component to impart rotation to the second rotatable component to rotatably drive the second interface.

In a specific aspect, the device further includes a third rotatable component rotatably mounted and coupled with the first rotatable component. The second rotatable component, wherein the third rotatable component further increases the torque magnification from the first rotatable component to the second rotatable component.

In another aspect in an embodiment, the first rotatable component, the second rotatable component, and a third rotatable component are sprockets connected with chains. In some embodiments, the third rotatable component includes two sprockets affixed to the same shaft, the two sprockets having different diameters.

In yet another aspect in an embodiment, the first rotatable component, the second rotatable component, and a third rotatable component have gears intermeshed with each other. In some embodiments, the third rotatable component includes two stacked gears affixed to the same shaft, the two gears having different numbers of teeth.

In some aspect, the device further includes one or more rotatable components supported by the housing and coupled with the first rotatable component, the second rotatable component, and the third rotatable component, for further increasing the torque magnification.

In yet another specific aspect, the first rotatable component, the second rotatable component, the third rotatable component, and the second interface with a portion of the input shaft of the trailer jack are encased in the housing and provided with lubricants. In some embodiments, the second interface includes a key connecting the second rotatable component to the shaft of the trailer jack. In some embodiments, the shaft of the trailer jack is a common shaft connecting at least two jacks of trailer, and operable to extend or retract the at least two trailer jacks.

In some other specific aspect, the first interface of the device includes a rotatable shaft having a proprietary connector accepting a matching connector attached onto a hand tool or a power tool. In some embodiments, the power tool includes a direct current battery powered drill. For example, the hand tool may be a crank.

In yet some other embodiments, the proprietary connector has a female receiving end having a shape of a trademark or a unique or distinctive shape that is not part of currently commonly available tool sets. This may provide an anti-theft defense. The matching connector may have a male protruding end having the shape of the trademark.

In a second general aspect, a heavy-duty trailer includes a trailer having one or more trailer jacks. The trailer may be configured to be raised or lowered by extending or retracting the one or more trailer jacks respectively. The one or more trailer jacks have a shaft operable to extend or retract legs of the one or more jacks. The heavy duty trailer further includes a first rotatable component rotatably mounted thereon and a second rotatable component rotatably mounted thereon. The first rotatable component is mechanically coupled with the second rotatable component. Rotation of the first rotatable component imparts rotation to the second rotatable component with torque magnification. The heavy-duty trailer further includes a first interface rotatably connected to the first rotatable component and a second interface rotatably connected to the second rotatable component. The second interface may be mechanically coupled with the shaft of the one or more trailer jacks. A rotation of the second interface drives a rotation of the shaft of the one or more trailer jacks to extend or retract the trailer jack. The first interface is configured to receive an input torque to rotate the first rotatable component to impart rotation to the second rotatable component to rotatably drive the second interface.

In a specific aspect, the shaft is perpendicular to the legs of the one or more jacks.

In another specific aspect, the first interface includes a rotatable shaft having a proprietary connector accepting a matching connector attached onto a hand tool or a power tool. In some embodiments, the power tool includes a direct current battery powered drill, or other similar power tools (such as corded power drill). In yet some other embodiments, the hand tool includes a crank.

In yet another specific aspect, the proprietary connector has a female receiving end having a shape of a trademark or an ornamental design element. The matching connector has a male protruding end having a mating shape of the same registered trademark for coupling with the female receiving end of the proprietary connector.

In a third general aspect, a trailer jack system may include a trailer having one or more trailer jacks. The trailer may be configured to be raised or lowered by extending or retracting the one or more trailer jacks respectively. The one or more trailer jacks have a shaft operable to extend or retract legs of the one or more trailer jacks. The trailer jack system further includes a second interface fastening or mechanically coupling or linking a second rotatable component to the shaft. A casing houses the second rotatable component and the second interface. A portion of the shaft may be installed in a sealed and lubricated manner. The trailer jack system further includes a first rotatable component supported in the casing. The first rotatable component is coupled with the second rotatable component that is rotatably supported in the casing. The first rotatable component and the second rotatable component may be mechanically connected to produce different rotation speeds to provide torque magnification. The trailer jack system also includes a first interface that can be coupled with the first rotatable component extending outside the casing, for receiving an input torque to extend or retract the legs of the one or more trailer jacks.

Detailed disclosure and examples are provided below.

DETAILED DESCRIPTION

This disclosure presents a device and a system having a high torque magnification or gear reduction ratio that, in certain implementations, may use power tools to mechanically connect to drive shafts of trailer jacks. The device enables the power tools to extend or retract the legs of the trailer jacks in an efficient and easy manner. The device may be installed or retrofitted to existing high capacity trailers or integrated with newly manufactured trailers. In some embodiments, the device has a first interface, a gear train or an equivalent torque magnification mechanism, and a second interface. The first interface enables a power tool or a hand tool to rotationally engage the gear train. The second interface enables the output torque from the gear train to apply onto the rotation shaft of the jacks. A common drill can thus couple with the first interface to lift or lower the trailer for efficient and easy operation. Details of the device and system are described below.

Figure 1:
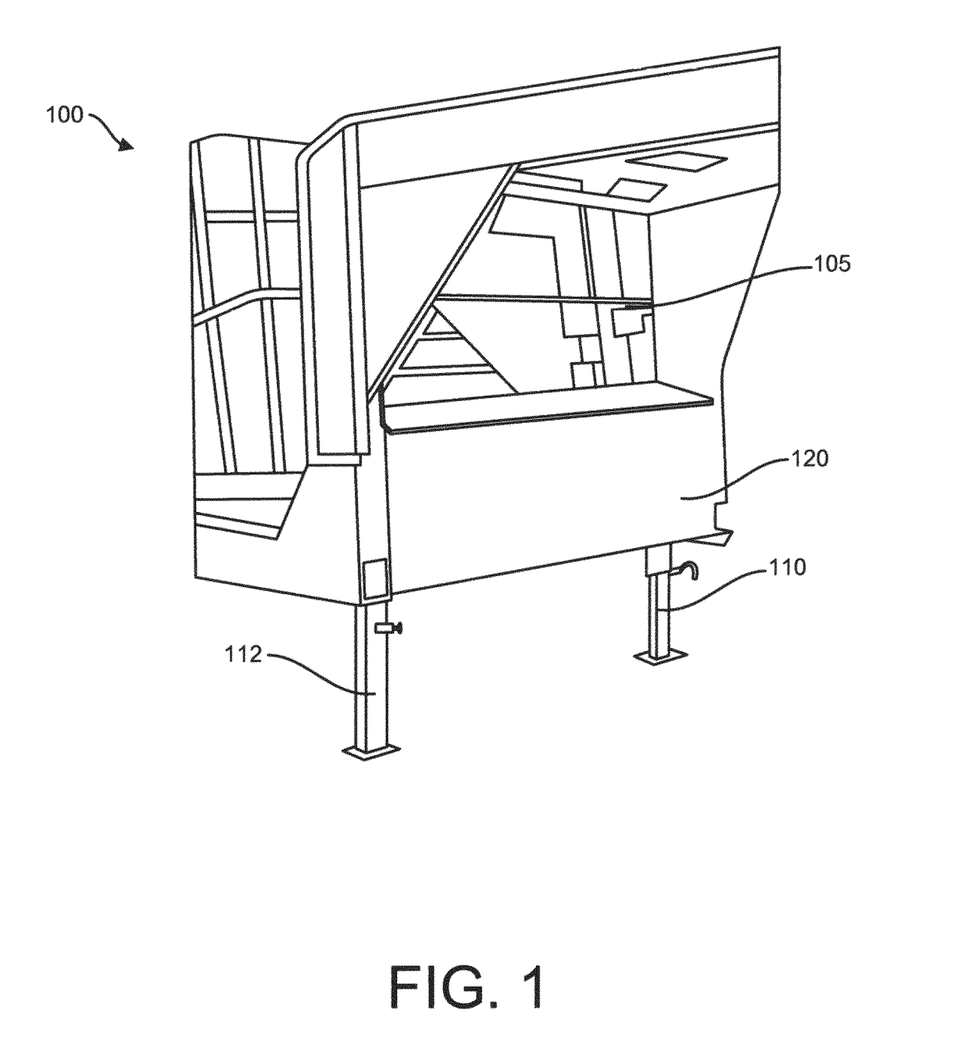
FIG. 1 is a perspective view of a portion of a trailer.

FIG. 1 is a perspective view of a portion of a trailer 100 having double square drop leg trailer jacks 110 and 112. The trailer jacks 110 and 112 are operable to extend or retract by rotating a common shaft 105, which connects to the internal gear mechanisms of the trailer jacks 110 and 112. In some embodiments, the internal gear mechanism may be mechanically connected or enclosed in a casing of the device 120. The device 120 may be integrated in the trailer 100 or may be a separate add-on mounted onto or positioned adjacent the trailer 100.

During operation, the rotation of the common shaft 105 is converted into a linear motion of the legs of the trailer jacks 110 and 112. The extension of the trailer jacks 110 and 112 can lift the trailer 100 up for engagement with a towing vehicle (not shown). The retraction of the trailer jacks 110 and 112 can lower the trailer 110 down or avoid touching the ground after the trailer 100 has been hitched onto a towing vehicle.

As illustrated in FIGS. 2A-2B and 3A-3B, the device 120 includes a first rotatable component 212 rotatably supported in a housing 205. The housing 205 may include an outer surface 213 exposing one or more components for engagement with external tools. The first rotatable component 212 is coupled with a second rotatable component 232 rotatably supported by a shaft 230 in the housing 205. The first rotatable component 212 and the second rotatable component 232 have different diameters for torque magnification. The device 120 further includes a first interface 210 rotatably connected to the first rotatable component 212, and a second interface 335 rotatably connected to the second rotatable component 232. The first rotatable component 212 and the second rotatable component 232 may be sprockets, gears, or pulleys or other rotatable components that are rotatably engaged to achieve a torque magnification. For example, the rotatable components 212 and 232 can be sprockets connected with chains (such as the chain 333), gears connected with or without intermediate gears in between, pulleys of different diameters connected with belts, or other equivalent rotatable components connected to maintain a desired torque magnification ratio at a desired distance.

The second interface 335 is mechanically coupled with the input or interface at the common shaft 105 of a trailer jack. A rotation of the second interface 335 would drive a rotation of the shaft 105 of the trailer jacks 110 and 112, as to extend or retract the trailer jacks 110 and 112. The first interface 210 receives an input torque that rotates the first rotatable component 212 and rotates the second rotatable component 232 to drive the second interface 335 to rotate.

In some embodiments, the device 120 includes a third rotatable component 216 supported by the housing 205 and coupled with the first rotatable component 212 and the second rotatable component. The third rotatable component 216 may further increase the torque magnification. For example, the first rotatable component 212 has a smaller diameter than the third rotatable component 216. The third rotatable component 216 (e.g., a sprocket, gear, or a pulley or other rotatable component) rotates together with a first same axial component 222 (e.g., a sprocket, gear, or a pulley or other rotatable component). In some embodiments, the third rotatable component 216 includes two sprockets or functionally equivalent rotatable members affixed to the same shaft 220. The two sprockets have different diameters and different number of teeth.

The first same axial component 222 has a smaller diameter than a second same axial component 234, which rotates together with the second rotatable component 232. Finally, the second rotatable component 232 has a smaller diameter than the driving portion 337 of the second interface 335. As a result, the mechanical transmission achieves three levels of torque magnifications.

By selecting the proper diameter differences between the rotatable components, a load-specific gear reduction ratio can be determined. As such, the first component requires relatively small input torque to operate the trailer jacks 110 and 112. In some embodiments, the device 120 may include additional one or more rotatable components supported by the housing 205 and coupled with the first rotatable component 212, the second rotatable component 216, and the third rotatable component 232, for further increasing the torque magnification.

Figure 2A:
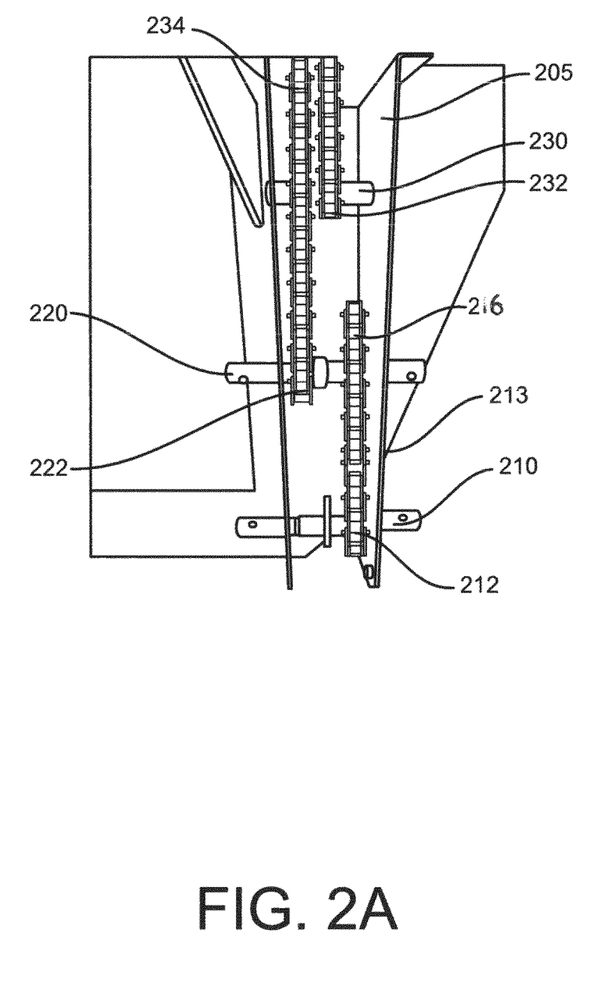
FIG. 2A illustrates a first embodiment of device providing torque magnification.
Figure 2B:
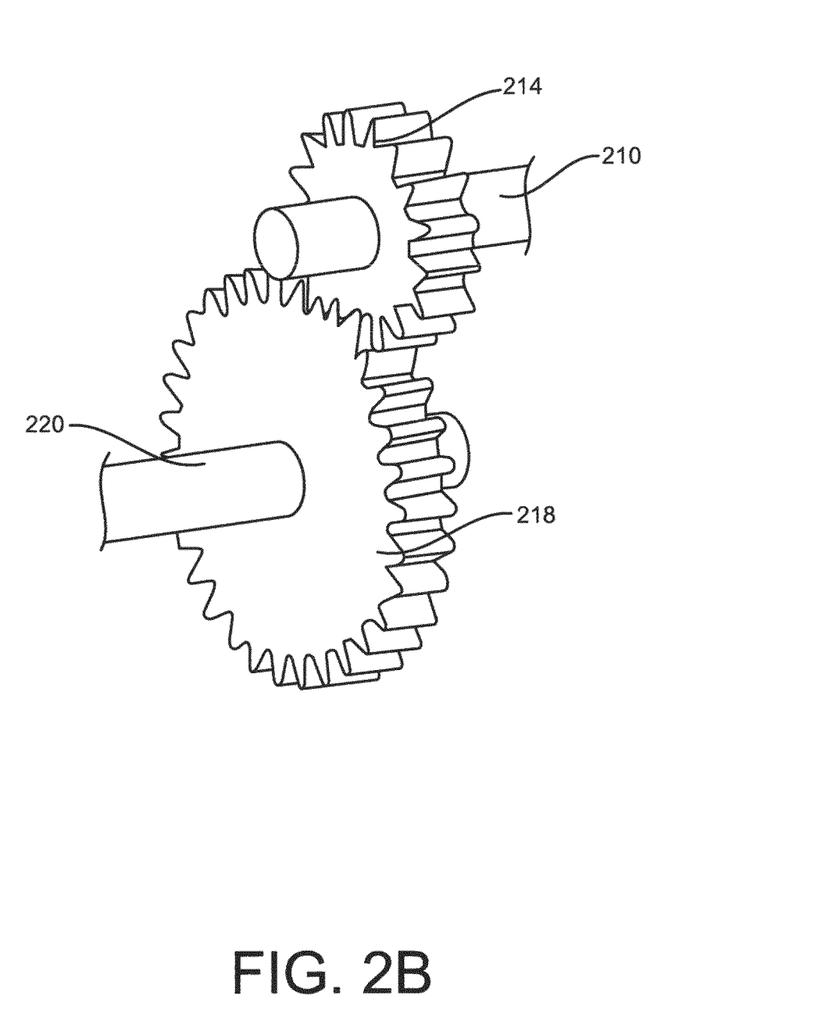
FIG. 2B illustrates a second embodiment of the device providing torque magnification.
Figure 3A:
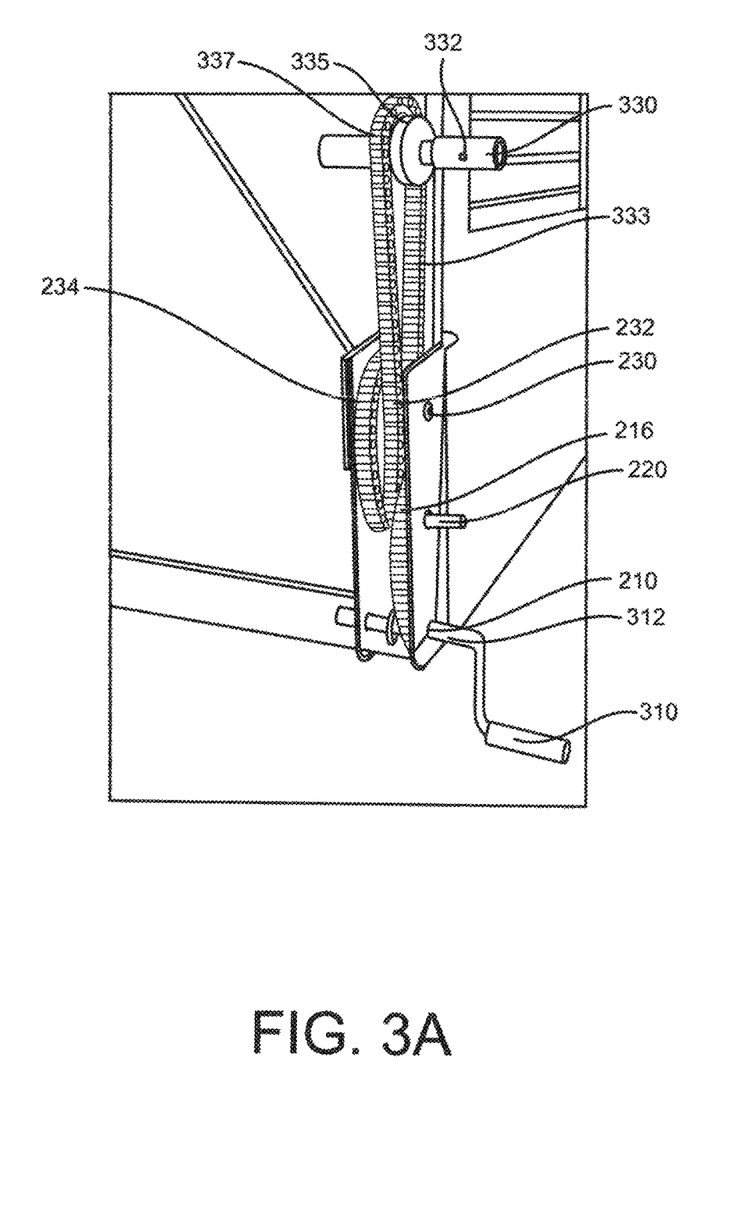
FIG. 3A illustrates a first interface receiving a hand tool for a torque input.

FIGS. 2A and 3A illustrate the mechanical transmission realized with sprockets and chains for the rotatable components 212, 232, 216, 222, 234, and 337, other embodiments may use different mechanical components, such as the gears illustrated in FIG. 2B. FIG. 2A shows a portion, under the shaft 330, of the mechanical transmission of FIG. 3A. For example, in FIG. 2B, the first rotatable component 214 can be engaged with a second rotatable component 218 with a desired gear reduction ratio selected based on the trailer load capacity as desired.

In some embodiments, the first rotatable component 212, the second rotatable component 232, and a third rotatable component 216 are gears intermeshed with each other. In some specific embodiments, the third rotatable component 216 may include two stacked gears affixed to the same shaft. The two stacked gears have different numbers of teeth.

In some embodiments, for better lubrication purposes, the housing 205 may be configured to encase the first rotatable component 212, the second rotatable component 232, the third rotatable component 216, and a portion of the input shaft 105 of the trailer jacks 110 and 112. For example, sprockets or gears of the first, the second, and the third rotatable components 212, 232, and 216 may be lubricated with an oil reservoir in the housing 205 or at least be shielded from external natural elements that may deteriorate the lubricants. The second hand tool interface 332, the shaft 220, and the first interface 210, however, may still be exposed outside of the housing 205 such that tools may engage these components for operation or repair work.

In some specific examples, the chains of the sprockets or gears may be lubricated through a rubber gasket that penetrates the metal encased box by using lubrication, such as products as WD-40, Liquid Wrench, etc. In other instances, the chains may be sprayed and cycled in order to have the device 120 to be fully lubricated. Additional oil would be added as needed through a drain plug located at the top of the metal encased box. In some embodiments, the second interface 335 may include a key connecting the second rotatable component 232 to the shaft 105 of the trailer jacks 110 and 102. In other embodiments, the second interface 335 may be welded onto the shaft 105.

Figure 3B:
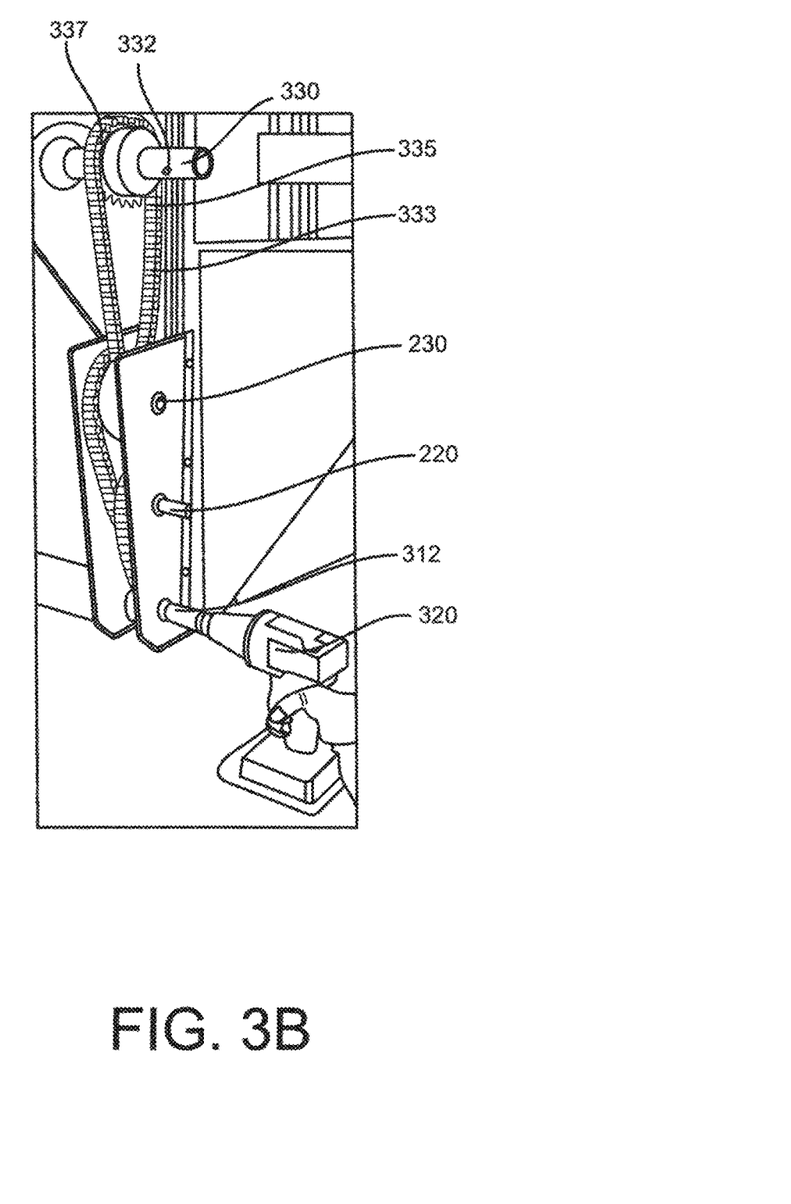
FIG. 3B illustrates a first interface receiving a power tool for torque input.

As illustrated in FIG. 3B, the power tool may include a direct current battery powered drill 320, such as a home-use power drill. In other situations, the power tool may be a corded drill, or similar powered rotational tools. As illustrated in FIG. 3A, the hand tool may include a crank 310 such that in the absence of any power tools, the device 120 may still be operated manually.

In some embodiments, a hand tool may directly engage with the shaft 105. In such situation, the second interface 335 may disengage the gear train from the shaft 105, for example, with a unidirectional clutch. In some embodiments, the first interface 212 may also be powered with a motor mounted onto the housing 205, such as a motor using onboard 12 V batteries. In other embodiments, the motor may be built in the housing 205 engaging the first rotatable component 212 while the first interface 210 still enables manual operation as a backup option.

Although FIGS. 2A-2B and 3A-3B illustrate the trailer 100 using double square drop leg trailer jacks 110 and 112, which are commonly used on open top and enclosed trailers, other configurations and applications of the device 120 are possible. For example, the device 120 may be mounted horizontally on a wheel mounted jack, which is commonly used on boat trailers, utility trailers, and cargo trailers. In other instances, the device 120 may be mounted horizontally on an A Frame trailer jack, which is commonly used on light duty utility and cargo trailers. In some other examples, the device 120 may be mounted vertically on a single square drop leg trailer jack, which is commonly used on open top and enclosed trailers.

Figure 4A:
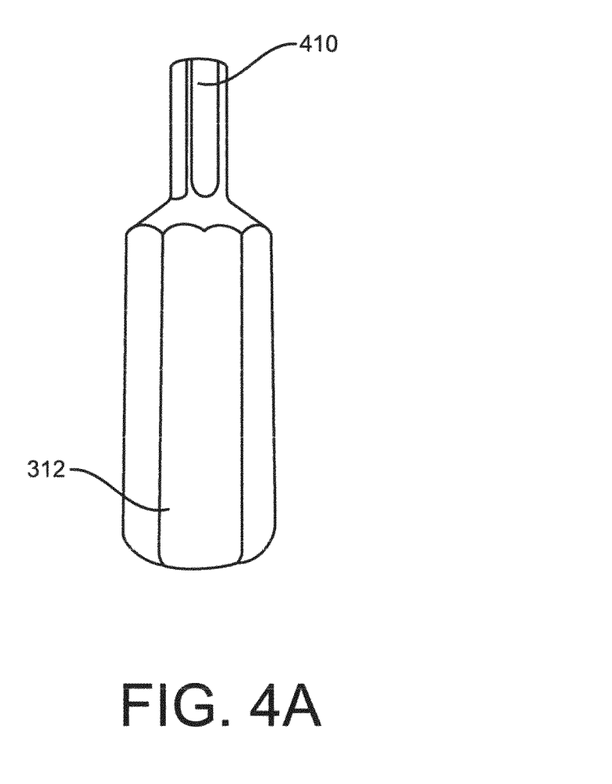
FIG. 4A illustrates an embodiment of a first interface.
Figure 4B:
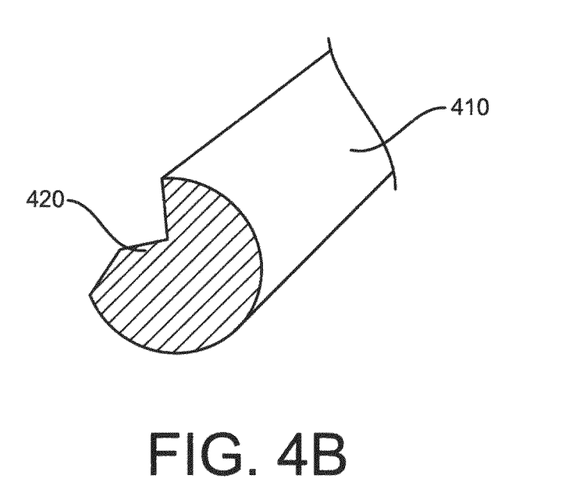
FIG. 4B is a local view of the embodiment of the first interface.
Like elements are labeled using like numerals.

FIG. 4A illustrates an embodiment of a proprietary connector 410. FIG. 4B is a local view of the embodiment of the proprietary connection 410. In some embodiments, the first interface 210 includes a rotatable shaft 312 having a proprietary connector accepting a matching connector 410 attached onto a hand tool or a power tool. As illustrated in FIG. 4B, the proprietary connector 410 has a profile 420 that is different from ordinary mechanical tools (such as having a hexagon or square shape). Thus, the profile 420 may function as an anti-theft key. Different profiles may be created upon unit production.

In some other embodiments, the proprietary connector 410 may have a female receiving end having a shape of an ornamental design that may serve as a trademark, and wherein the matching connector having a male protruding and having the corresponding mating shape of the trademark. As a result, because of the unique profile of the first interface, such profile may function as an anti-theft device as other common hand tools would not fit such profile and thus unable to produce an effective input torque.

Other configurations are possible. For example, although the power tool 320 and the manual crank 310 are illustrated to be external to the housing 205, some implementations may place the power tool 320 or the manual crank 310 inside the housing 205 or as part of the mechanical transmission package. In some embodiments, the mechanical transmission may be configured as an independent package that may be retrofitted to existing heavy duty trailers. In some other implementations, the mechanical transmission maybe added to existing heavy duty trailers during production, such that the mechanical transmission is sold together with and as part of the heavy duty trailer.

What is claimed is:

1. A device comprising:
   a first rotatable component rotatably mounted;
   a second rotatable component rotatably mounted, wherein the first rotatable component is mechanically coupled with the second rotatable component and wherein rotation of the first rotatable component imparts rotation to the second rotatable component with a torque magnification;
   a third rotatable component rotatably mounted and mechanically coupled with the first rotatable component and the second rotatable component, wherein the third rotatable component further increases the torque magnification;
   wherein the first rotatable component, the second rotatable component, and the third rotatable component have gears intermeshed with each other;
   a first interface rotatably connected to the first rotatable component;
   a second interface rotatably connected to the second rotatable component, the second interface mechanically coupled with an input shaft of a trailer jack, wherein a rotation of the second interface drives a rotation of the input shaft of the trailer jack to extend or retract the trailer jack; and
   wherein the first interface is configured to receive an input torque to rotate the first rotatable component to impart rotation to the second rotatable component to rotatably drive the second interface.

2. The device of claim 1, wherein the first rotatable component, the second rotatable component, and the third rotatable component are sprockets connected with chains.

3. The device of claim 2, wherein the third rotatable component includes two sprockets affixed to the same shaft, the two sprockets having different diameters.

4. The device of claim 1, wherein the third rotatable component includes two stacked gears affixed to the same shaft, the two gears having different numbers of teeth.

5. The device of claim 1, further comprising one or more rotatable components supported by a housing and coupled with the first rotatable component, the second rotatable component, and the third rotatable component, for further increasing the torque magnification.

6. A device comprising:
   a first rotatable component rotatably mounted;
   a second rotatable component rotatably mounted, wherein the first rotatable component is mechanically coupled with the second rotatable component and wherein rotation of the first rotatable component imparts rotation to the second rotatable component with a torque magnification;
   a third rotatable component rotatably mounted and mechanically coupled with the first rotatable component and the second rotatable component, wherein the third rotatable component further increases the torque magnification;
   a first interface rotatably connected to the first rotatable component;
   a second interface rotatably connected to the second rotatable component, the second interface mechanically coupled with an input shaft of a trailer jack, wherein a rotation of the second interface drives a rotation of the input shaft of the trailer jack to extend or retract the trailer jack;
   wherein the second interface comprises a key connecting the second rotatable component to the shaft of the trailer jack;
   wherein the first interface is configured to receive an input torque to rotate the first rotatable component to impart rotation to the second rotatable component to rotatably drive the second interface; and
   wherein the first rotatable component, the second rotatable component, the third rotatable component, and a portion of the input shaft of the trailer jack are encased in a housing and provided with lubricants.

7. The device of claim 6, wherein the shaft of the trailer jack is a common shaft connecting at least two trailer jacks and operable to extend or retract the at least two trailer jacks.

8. The device of claim 6, wherein the first interface comprises a rotatable shaft having a proprietary connector accepting a matching connector.

9. The device of claim 8, further comprising a power tool with a direct current battery powered drill attached to the first interface.

10. The device of claim 8, further comprising a hand tool with a crank attached to the first interface.

11. The device of claim 8, wherein the proprietary connector has a female receiving end having a distinctive ornamental shape, and wherein the matching connector has a male protruding end mating with having the ornamental shape.

12. A heavy-duty trailer comprising:
    a trailer having one or more trailer jacks, the trailer configured to be raised or lowered by extending or retracting the one or more trailer jacks respectively, wherein the one or more trailer jacks have a shaft operable to extend or retract legs of the one or more jacks;
    a first rotatable component rotatably mounted;
    a second rotatable component rotatably mounted, wherein the first rotatable component is mechanically coupled with the second rotatable component and wherein rotation of the first rotatable component imparts rotation to the second rotatable component with torque magnification;
    a third rotatable component rotatably mounted and mechanically coupled with the first rotatable component and the second rotatable component, wherein the third rotatable component further increases the torque magnification;
    wherein the first rotatable component, the second rotatable component, and the third rotatable component have gears intermeshed with each other;
    a first interface rotatably connected to the first rotatable component;
    a second interface rotatably connected to the second rotatable component, the second interface mechanically coupled with the shaft of the one or more trailer jacks, wherein a rotation of the second interface drives a rotation of the shaft of the one or more trailer jacks to extend or retract the trailer jack legs; and wherein the first interface is configured to receive an input torque to rotate the first rotatable component to impart rotation to the second rotatable component to rotatably drive the second interface.

13. The heavy-duty trailer of claim 12, wherein the shaft is perpendicular to one or more of the legs of the one or more jacks.

14. The heavy-duty trailer of claim 12, wherein the first interface comprises a rotatable shaft having a proprietary connector accepting a matching connector attached onto a hand tool or a power tool.

15. The heavy-duty trailer of claim 14, wherein the power tool comprises a direct current battery powered drill.

16. The heavy-duty trailer of claim 14, wherein the hand tool comprises a crank.

17. The heavy-duty trailer of claim 14, wherein the proprietary connector has a female receiving end having an ornamental shape for receiving a torque, and wherein the matching connector has a male protruding end having a mating shape of the ornamental shape of the female receiving end for applying a torque.

18. A system comprising:
- a trailer having one or more trailer jacks, the trailer configured to be raised or lowered by extending or retracting the one or more trailer jacks respectively, wherein the one or more trailer jacks have a shaft operable to extend or retract legs of the one or more trailer jacks;
- a second interface fastening a second rotatable component to the shaft;
- a casing housing the second rotatable component and the second interface, and a portion of the shaft in a sealed and lubricated manner;
- a first rotatable component rotatably supported in the casing, the first rotatable component coupled with the second rotatable component rotatably supported in the casing, the first rotatable component and the second rotatable component mechanically connected to produce different rotation speeds to provide torque magnification;
- a first interface coupled with the first rotatable component extending outside the casing for receiving an input torque to extend or retract the legs of the one or more trailer jacks; and
- a third rotatable component rotatably supported in the casing, the third rotatable component coupled with the first rotatable component and the second rotatable component rotatably supported in the casing, wherein the third rotatable component further increases the torque magnification; and
- wherein the first rotatable component, the second rotatable component, and the third rotatable component have gears intermeshed with each other.

19. The system of claim 18, wherein the third rotatable component includes two stacked gears affixed to the same shaft, the two gears having different numbers of teeth.

20. The heavy-duty trailer of claim 12, wherein the third rotatable component includes two stacked gears affixed to the same shaft, the two gears having different numbers of teeth.

* * * * *